United States Patent
Spiess et al.

(10) Patent No.: US 11,461,115 B2
(45) Date of Patent: Oct. 4, 2022

(54) THIRD PARTY EXECUTABLE ASSET BUNDLE DEPLOYMENT

(71) Applicant: SAP SE, Walldorf (DE)

(72) Inventors: Michael Spiess, Wiesloch (DE); Jonathan Markgraf, Laudenbach (DE)

(73) Assignee: SAP SE, Walldorf (DE)

( * ) Notice: Subject to any disclaimer, the term of this patent is extended or adjusted under 35 U.S.C. 154(b) by 0 days.

(21) Appl. No.: 16/774,470

(22) Filed: Jan. 28, 2020

(65) Prior Publication Data

US 2021/0232413 A1    Jul. 29, 2021

(51) Int. Cl.
*G06F 9/44*      (2018.01)
*G06F 9/445*     (2018.01)
*G06F 8/41*      (2018.01)
*H04L 67/00*     (2022.01)
*G06F 9/451*     (2018.01)
*G06F 8/60*      (2018.01)

(52) U.S. Cl.
CPC .......... *G06F 9/44526* (2013.01); *G06F 8/447* (2013.01); *G06F 8/60* (2013.01); *G06F 9/451* (2018.02); *H04L 67/34* (2013.01)

(58) Field of Classification Search
CPC ....... A63F 13/77; G06F 9/44526; G06F 8/447
USPC ........................................................ 717/140
See application file for complete search history.

(56) References Cited

U.S. PATENT DOCUMENTS

| 7,159,212 B2 * | 1/2007 | Schenk | G06T 15/00 |
| | | | 717/146 |
| 8,317,606 B2 * | 11/2012 | Graham | A63F 13/77 |
| | | | 463/29 |
| 9,116,714 B2 * | 8/2015 | Wu | G06F 8/433 |
| 9,558,533 B2 * | 1/2017 | Goossens | G06T 5/00 |

(Continued)

FOREIGN PATENT DOCUMENTS

| CN | 105336241 A | 2/2016 |
| CN | 107731081 A | 2/2018 |
| CN | 107861714 A | 3/2018 |

OTHER PUBLICATIONS

Oana-Aurora Moraru; "Cross-Platform Development Approaches for the Mobile Device Platforms Android and iOS"; Faculty of Informatics at the Vienna University of Technology; TU Wien—Jul. 22, 2014.*

(Continued)

*Primary Examiner* — Francisco J Aponte
(74) *Attorney, Agent, or Firm* — Klarquist Sparkman, LLP

(57) ABSTRACT

Technologies are provided for generating executable asset bundles using a plug-in module loaded in an integrated development environment (IDE). The IDE can be used to create and edit source code assets and three-dimensional (3D) model assets that can be compiled into an executable program. The plug-in module can be used to generate an executable asset bundle based on a subset of the source code assets. Optionally, the executable asset bundle can include a subset of the 3D model assets. The IDE can be used to (Continued)

generate an executable program based on the remaining source code assets and 3D model assets. The executable program and the executable asset bundle can be distributed separately. The executable program can be executed by a client computing device and used to load the executable asset bundle on the client device. Loading the executable asset bundle can comprise downloading it from a remote server.

19 Claims, 8 Drawing Sheets

(56) References Cited

U.S. PATENT DOCUMENTS

| | | | | |
|---|---|---|---|---|
| 9,639,378 | B2* | 5/2017 | Goossens | G06F 9/44526 |
| 9,792,778 | B2* | 10/2017 | Irby, II | G07F 17/34 |
| 9,817,655 | B1* | 11/2017 | Mandrika | G06F 8/65 |
| 10,025,758 | B2* | 7/2018 | Brown | H04L 67/06 |
| 10,338,902 | B1* | 7/2019 | Sevigny | G06F 8/433 |
| 10,365,919 | B1* | 7/2019 | Mandrika | G06F 8/71 |
| 10,551,993 | B1* | 2/2020 | Sanocki | G06F 3/017 |
| 10,769,857 | B2* | 9/2020 | Drouin | G06T 19/006 |
| 2006/0259386 | A1* | 11/2006 | Knowlton | G06F 8/30 |
| | | | | 705/35 |
| 2009/0083268 | A1* | 3/2009 | Coqueret | G06F 16/219 |
| 2014/0168243 | A1* | 6/2014 | Huang | G06T 1/20 |
| | | | | 345/522 |
| 2015/0143302 | A1* | 5/2015 | Chang | G06F 16/951 |
| | | | | 715/849 |
| 2016/0062745 | A1* | 3/2016 | Rao | G06F 8/33 |
| | | | | 717/109 |
| 2016/0070547 | A1* | 3/2016 | Ramanathan | G06F 8/36 |
| | | | | 717/107 |
| 2016/0071318 | A1* | 3/2016 | Lee | G06T 17/00 |
| | | | | 345/419 |
| 2018/0342106 | A1* | 11/2018 | Rosado | G06Q 10/109 |
| 2019/0344181 | A1* | 11/2019 | Ante | G06F 16/901 |
| 2020/0341777 | A1* | 10/2020 | Kashyn | G06F 11/3696 |
| 2021/0016179 | A1* | 1/2021 | Ante | A63F 13/352 |

OTHER PUBLICATIONS

Erdi Izgi; "Framework for Roguelike Video Games Development"—Charles University—Department of Software and Computer Science Education; Computer Graphics and Game Development, Prague 2018; Master Thesis.*

Vuforia Developer Library, "Getting Started with Vuforia Engine in Unity," https://library.vuforia.com/articles/Training/getting-started-with-vuforia-in-unity.html, 13 pages, retrieved on Jan. 24, 2020.

Tsung, "The Clock's Ticking: How to Optimize Compile Time in Unity," https://medium.com/the-unity-developers-handbook/tlte-clocks-ticking-how-to-optimize-compile-time-in-unity-45d1f200572b, 5 pages, Jul. 12, 2016, retrieved on Jan. 24, 2020.

"Unity Announces BIM Collaboration Software at AIA," https://aecmag.com/technology-mainmenu-35/1822-unity-announces-bim-collaboration-software-at-aia, 5 pages, Jun. 6, 2019, retrieved Jan. 24, 2020.

"Angry Ant," https://www.angryant.com/2014/04/25/Construct/, 8 pages, Apr. 25, 2014, retrieved Jan. 24, 2020.

Jet Island Mods, "Developing Mods—Example Power Up," https://mods.jet-is.land/developing, 10 pages, retrieved on Jan. 24, 2020.

"Working with Vuforia Engine in Unity," https://library.vuforia.com/content/vuforia-library/en/articles/Solution/Working-With-Vuforia-and-Unity.html, 13 pages, retrieved Jan. 24, 2020.

* cited by examiner

THIRD PARTY EXECUTABLE ASSET BUNDLE DEPLOYMENT

BACKGROUND

Integrated development environments (IDEs) enable software developers to create executable computer programs. An IDE can provide user interfaces for editing source code and compiling source code into executable programs. At least some IDEs allow developers to create plug-in modules that extend and/or modify functionality provided by the IDE. Some IDEs (such as the UNITY® real-time development platform) allow developers to design three-dimensional (3D) models that can be used to create interactive 3D programs (such as VR applications and AR applications). In most cases, source code in a single project in an IDE is used by the IDE to produce an executable program in which the instructions generated using the source code are stored in a single executable file, or one or more executable files that are linked together.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

In an example embodiment, a method comprises loading a plug-in module into an integrated development environment, wherein the plug-in module modifies functionality provided by the integrated development environment; using the plug-in module and the integrated development environment to generate an executable asset bundle based on one or more source code assets loaded in the integrated development environment; exporting the executable asset bundle from the integrated development environment; and compiling the project into an executable program using the integrated development environment without the one or more source code assets in the executable asset bundle.

In another example embodiment, one or more computer-readable storage media comprise instructions that, when executed by one or more processors, cause the one or more processors to perform operations, the operations comprising: displaying a plug-in user interface in an integrated development environment, wherein the plug-in user interface is provided by a plug-in module that modifies functionality provided by the integrated development environment; using the plug-in user interface and the integrated development environment to generate an executable asset bundle based on one or more source code assets and one or more three-dimensional model assets in a project in the integrated development environment; exporting the executable asset bundle from the integrated development environment; and generating an executable program using the integrated development environment, wherein the one or more source code assets and the one or more three-dimensional model assets in the executable asset bundle are excluded from the executable program.

In another example embodiment, a system comprises a computing device comprising an integrated development environment. The computing device is configured to: load a plug-in module into the integrated development environment, wherein the plug-in module modifies functionality provided by the integrated development environment; receive a selection of one or more source code assets loaded in the integrated development environment via a user interface of the plug-in module; generate an executable asset bundle based on the selected one or more source code assets using the plug-in module; export the executable asset bundle from the integrated development environment; and generate an executable program based on the project, wherein the executable program excludes the selected one or more source code assets.

As described herein, a variety of other features and advantages can be incorporated into the technologies as desired.

DETAILED DESCRIPTION

Example 1—Overview

Figure 1:
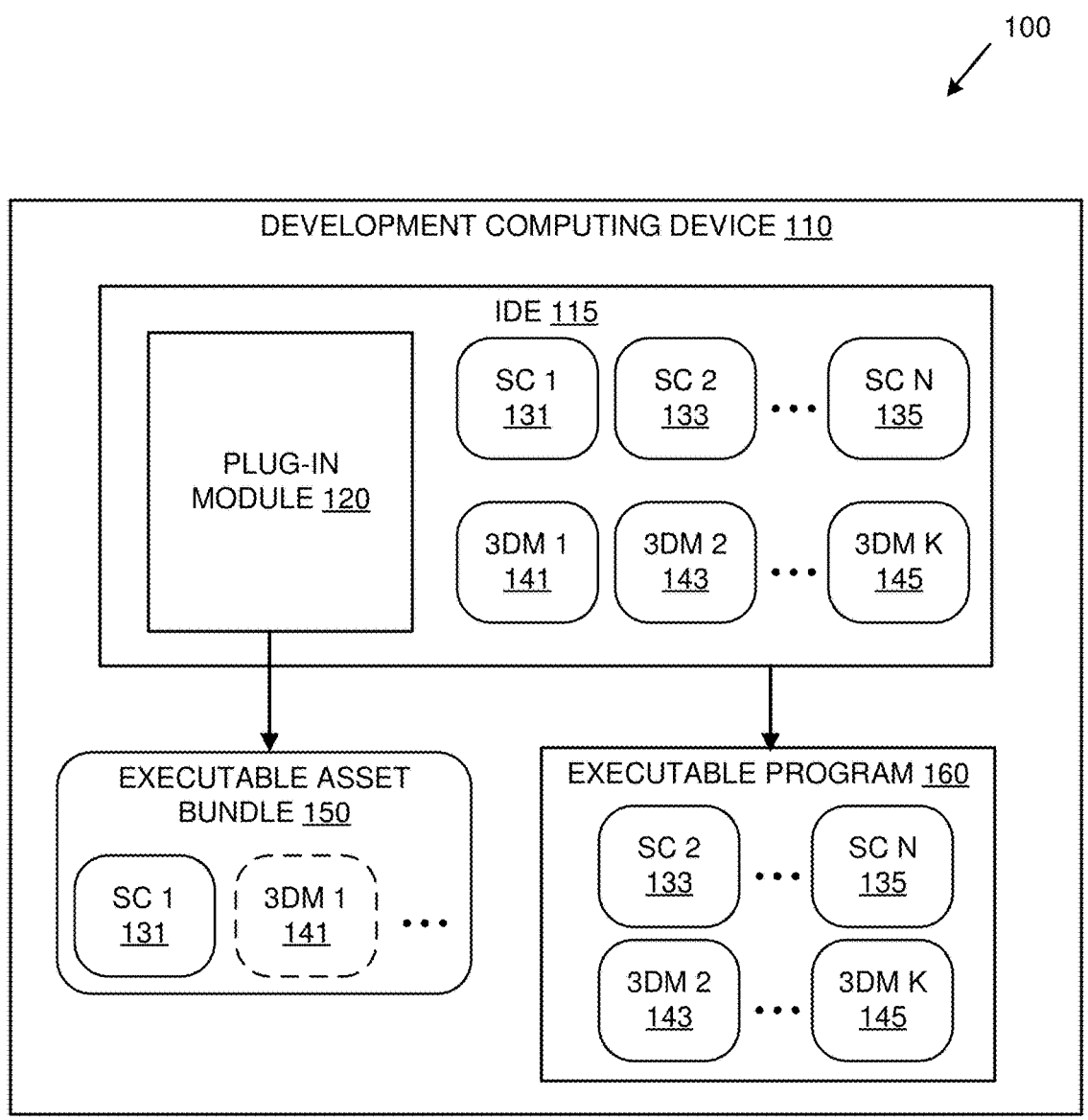
FIG. 1 is a system diagram depicting an example system for generating executable asset bundles

The description provided herein is directed to various technologies for generating, distributing, and executing executable asset bundles.

An integrated development environment (IDE) can be used to create and edit source code assets and to generate executable programs based on the source code assets. In at least some cases, an IDE can also be used to manage and/or edit three-dimensional (3D) assets, such as 3D models (e.g., 3D mesh objects, etc.), that can be used to create interactive 3D applications. For example, 3D model assets can be loaded into an IDE and source code assets can be created using the IDE for interacting with the 3D model assets.

Thus, an IDE can provide a convenient environment for a developer to create an executable program. However, few options exist today for creating programs where one developer (or organization) wishes to collaborate with another developer (or organization) in the development of an executable program without relinquishing control of distribution of their contributions. For example, one organization may provide source code and 3D model assets (and possibly other computer program assets as well) for a 3D application. Another organization may wish to provide additional 3D model assets and/or code that can be used within the 3D application and that can interact with the other code and 3D model assets in the 3D application directly. To do so, it may be convenient for developers of the another organization to develop their source code assets and/or 3D model assets in an IDE with assets provided by the other organization also loaded in the IDE. However, in many cases, doing so would require creating an executable program using the IDE that includes all the assets provided by both organizations. Thus, if either of the organizations wishes to avoid this unified compilation, in many cases an IDE cannot be used to develop the program assets as part of a single application.

Various technologies described herein can be used to address this problem by generating an executable asset bundle. A plug-in module can be provided for an IDE that allows a developer to select one or more source code assets and/or one or more 3D model assets and to generate an executable asset bundle based on the selected assets that is separate from an executable program that is generated by the IDE based on the remaining source code and 3D model assets that are loaded in the IDE. The executable program can include logic for loading the executable asset bundle at runtime. In at least some embodiments, this logic can be automatically included in the executable program by the plug-in module. Thus, in at least some scenarios, program assets provided by one developer (or organization) can be developed in an IDE along with program assets provided by another developer (or organization) as if they were part of a same application without compiling the program assets from both developers (or organizations) into a single executable program.

The executable program can be executed on a client computing device. In response to an event (such as an interaction with a user interface of the executable program) the executable program can load the executable asset bundle on the client computing device. In at least some embodiments, the executable instructions and/or 3D model assets contained in the executable asset bundle can be loaded into a memory space of the executable program and used as part of the executable program.

FIG. 1 is a system diagram depicting an example system 100 for generating executable asset bundles (e.g., 150). The example system 100 comprises a computing device 110 configured for application development. The computing device 110 comprises an integrated development environment (IDE) 115. For example, the IDE 115 can comprise a development environment for developing executable programs, such as three-dimensional (3D) interactive applications. Example 3D interactive applications include virtual reality applications, augmented reality applications, etc. In a particular embodiment, the IDE 115 comprises a UNITY® real-time development platform.

In a different or further embodiment, the plug-in module can be used to exclude code dependencies from the executable asset bundle. For example, when a source code asset is included in the executable asset bundle, the plug-in module can determine code dependencies of the source code asset and automatically include them in the executable asset bundle. A user interface of the plug-in module can be used to exclude one or more of the code dependencies from inclusion in the executable asset bundle. In at least some embodiments, a code dependency can be excluded based on a configuration of a client computing device where the executable program and the executable asset bundle will be executed. For example, a code dependency can be excluded from an executable asset bundle by a server when the executable asset bundle is downloaded from the server by a client computing device.

Example 2—Example Systems and Methods for Generating Executable Asset Bundles

In any of the examples described herein, systems and methods can be provided for generating executable asset bundles.

FIG. 1 is a system diagram depicting an example system 100 for generating executable asset bundles (e.g., 150). The example system 100 comprises a computing device 110 configured for application development. The computing device 110 comprises an integrated development environment (IDE) 115. For example, the IDE 115 can comprise a development environment for developing executable programs, such as three-dimensional (3D) interactive applications. Example 3D interactive applications include virtual reality applications, augmented reality applications, etc. In a particular embodiment, the IDE 115 comprises a UNITY real-time development platform.

The IDE 115 can comprise a plurality of source code assets 131-135. In some embodiments, source code assets 131-135 can comprise separate files and/or records stored on the computing device 110 and that are accessible by the IDE 115. Additionally or alternatively, a plurality of the source code assets 131-135 can be stored in a same file and/or record. A source code asset comprises one or more source code instructions that, when processed by a compiler or interpreter can be used to generate one or more executable instructions. Example source code assets include classes, methods, functions, scripts, shaders, etc. The one or more source code instructions in a source code asset can be written in one or more programming languages.

The IDE 115 can comprise a plurality of 3D model assets 141-145. In some embodiments, the 3D model assets 141-145 can comprise separate files and/or records stored on the computing device 110 and that are accessible by the IDE 115. Additionally or alternatively, a plurality of the 3D model assets 141-145 can be stored in a same file and/or record. A 3D model asset can comprise a representation of one or more 3D objects. In at least some embodiments, one or more of the 3D model assets 141-145 comprise a plurality of 3D coordinates (or vertices). In at least some such embodiments, the plurality of 3D coordinates can be arranged in 3D primitives (such as triangles or the like). Additionally or alternatively, one or more of the 3D model assets 141-145 can comprise one or more textures which can be used to represent external surface(s) of one or more of the 3D objects. In a particular embodiment, the 3D model assets 141-145 comprise one or more UNITY® real-time development platform prefab assets.

At least some of the source code assets 131-135 can comprise instructions for manipulating one or more of the 3D model assets 141-145. For example, a source code asset can comprise instructions for displaying and/or transforming one or more 3D objects defines by one or more 3D model assets.

In at least some embodiments, the IDE 115 can be used to edit the source code assets 131-135 and/or the 3D model assets 141-145. Additionally or alternatively, the IDE 115 can be used to orchestrate one or more of the 3D model assets 141-145 in a 3D interactive application. In such an embodiment, one or more of source code assets 131-135 can be created in the IDE 115 and used to manipulate one or more of the 3D model assets 141-145 in the 3D interactive application. For example, an editor (not shown) of the IDE 115 can be used to edit one or more of the source code assets 131-135 to include instructions for interacting with and/or manipulating one or more of the 3D model assets 141-145.

Although only source code assets 131-135 and 3D model assets 141-145 are depicted, the IDE 115 can be configured to support other types of development assets as well. Other types of assets that can be supported include textures, pre-compiled libraries, configuration files, etc.

In at least some embodiments, development assets (e.g., 131-135 and 141-145) can be organized in a project (not shown) that can be loaded into the IDE 115. A project can be used to organize a plurality of development assets (e.g., 131-135 and 141-145) that are logically associated and/or to provide metadata that can be used by the IDE 115 in the processing of the development assets.

The IDE 115 comprises a plug-in module 120 that can be used to generate an executable asset bundle 150. The executable asset bundle 150 is based on one or more of the source code assets 131-135. Optionally, the executable asset bundle can also be based one or more of the 3D model assets 141-145. For example, the executable asset bundle 150 can comprise executable instructions based on the source code asset 131 and/or one or more 3D object representations based on the 3D model asset 141. In at least some embodiments, the source code asset 131 can include source code for manipulating and/or interacting with one or more 3D objects represented by the 3D model asset 141. In such an embodiment, the executable asset bundle 150 can comprise executable instructions for manipulating and/or interacting with the one or more 3D object representations based on the 3D model asset 141. It is possible for the executable asset bundle 150 to be based on other types of development assets as well (such as image assets, audio assets, data structures, configuration files, etc.). In a particular embodiment, the executable asset bundle comprises one or more UNITY® real-time development platform prefabs.

The plug-in module 120 can comprise executable instructions that, when loaded into the IDE 115, extend and/or modify the functionality of the IDE 115. For example, the plug-in module 120 can modify the functionality of the IDE 115 to enable the IDE 115 to be used to generate the executable asset bundle 150. The plug-in module 120 can be configured to generate the executable asset bundle 150 and to export the executable asset bundle from the IDE 115. The plug-in module 120 can comprise one or more user interfaces that can be used by a user of the IDE 115 to select one or more of the source code assets 131-135 and/or one or more of the 3D model assets 141-145 to be included in the executable asset bundle 150. The plug-in module 120 can be provided by a third party that did not develop the IDE 115. In at least some embodiments, the IDE 115 provides one or more application programming interfaces that plug-in module developers can use to integrate plug-in modules (e.g., 120) with a run time of the IDE 115. Additionally or alternatively, an installation of the plug-in module 120 can comprise modifying one or more executable files of the IDE 115 to configure the IDE 115 to load the plug-in module 120. For example, the IDE 115 can be configured to display one or more user interfaces provided by the plug-in module 120.

In at least some embodiments, the plug-in module 120 can be used to exclude a code dependency of one or more source code assets (e.g., 131) from the executable asset bundle 150. For example, the plug-in module 120 can include a plug-in user interface that can be used to detect a selection of one or more code dependencies to exclude from the executable asset bundle 150. In such embodiments, the plug-in module 120 can be configured to detect code dependencies of selected source code assets (e.g., 131) and to automatically include the code dependencies in the executable asset bundle 150. However, it may not be necessary (or useful) to include one or more of the detected code dependencies in the executable asset bundle 150. For example, a detected code dependency may already be installed on a client computing device to which the executable asset bundle 150 will be deployed, thus making the code dependency's inclusion in the executable asset bundle 150 redundant. In at least some cases, excluding such redundant dependencies from the executable asset bundle 150 can reduce the size of the executable asset bundle 150 and/or promote compatibility of the executable asset bundle 150 with the target client computing device.

The IDE 115 can be used to generate an executable program 160. The executable program 160 can comprise one or more of the source code assets 131-135. In at least some embodiments, the executable program can further comprise one or more of the 3D model assets 141-145. Generating the executable program 160 can comprise generating executable instructions based on the one or more of the source code assets 131-135 (for example, by compiling source code instructions in the one or more source code assets 131-135). In at least some embodiments, the executable program 160 can exclude source code assets and/or 3D model assets that are included in the executable asset bundle 150. For example, FIG. 1 depicts the executable asset bundle 150 as including the source code asset 131 and optionally including the 3D model asset 141, while the executable program 160 is depicted as including the remaining development assets 133-135 and 143-145.

The development assets included in the executable asset bundle 150 can be excluded from the executable program 160 so that the assets in the executable bundle 150 can be deployed independently of the executable program 160. In this way, the plug-in module 120 can be used to enable the development of source code and/or 3D model assets, which a developer wishes to deploy and maintain separately, in conjunction with other development assets within the IDE 115.

Figure 2:
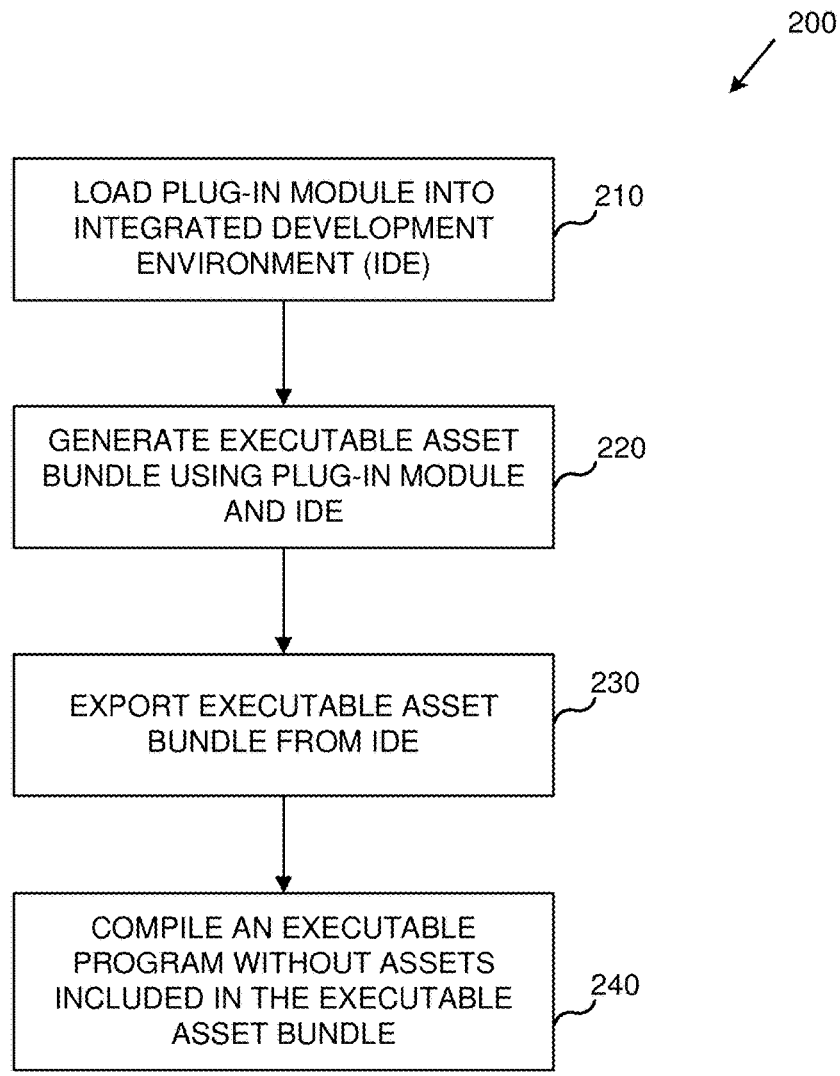
FIG. 2 is a flowchart of an example method for generating an executable asset bundle.

FIG. 2 is a flowchart of an example method 200 for generating an executable asset bundle. Any of the example systems described herein can be used to perform the example method 200. For example, the example system 100 can be used to perform the example method 200.

At 210, a plug-in module is loaded into an integrated development environment (IDE). For example, the plug-in module 120 can be loaded into the IDE 115. Loading the plug-in module into the IDE can comprise displaying one or more user interfaces defined in the plug-in module within a parent user interface (such as a window, etc.) of the IDE. Additionally or alternatively, executable instructions to initialize the plug-in module can be executed as part of an execution context of the IDE. In at least some embodiments, loading the plug-in module in the IDE can be supported by one or more application programming interfaces of the IDE. In at least some such embodiments, loading of the plug-in module can be triggered in response to an interaction made by a user with a user interface of the IDE (such as a selection of a menu item, etc.). Additionally or alternatively, one or more executable files of the IDE can be modified to configure the IDE to load the plug-in module.

At 220, an executable asset bundle is generated using the plug-in module and the IDE. For example, the plug-in module 120 and the IDE 115 can be used to generate the executable asset bundle 150. The executable asset bundle can be based on one or more source code assets loaded in the IDE. Additionally or alternatively, the executable asset bundle can be based on one or more three-dimensional (3D) model assets loaded in the IDE. The one or more source code assets and/or the one or more 3D model assets can be selected via user interface components loaded by the plug-in module into a user interface of the IDE. The same (or a different) user interface components can be used to generate the executable asset bundle.

In at least some embodiments, a user interface component loaded into the IDE user interface by the plug-in module can be used to exclude a code dependency of one of the one or more source code assets. A code dependency is a code resource (such as a source code file, a compiled library, etc.) that is referenced by the source code asset. Thus, the source code asset depends on the code resource for its correct compilation, interpretation, execution, etc. The plug-in module can be used to detect code dependencies of the one or more source code assets included in the executable asset bundle. In at least some embodiments, the code dependencies can be identified via one or more user interface components of the plug-in module. The same, or different, user interface components can be used to exclude one or more of the detected code dependencies from the executable asset bundle.

In at least some embodiments, the source code and/or 3D model assets can be part of a development project open in the IDE. Additionally or alternatively, the IDE can comprise a platform for developing 3D interactive applications (such as virtual reality applications, augmented reality applications, or the like).

At 230, the executable asset bundle is exported from the IDE. In at least some embodiments, exporting the executable asset bundle can comprise saving the executable asset bundle to a storage of a computing device on which the IDE is executing. For example, the executable asset bundle 150 can be exported to a storage of the computing device 110. Additionally or alternatively, the executable asset bundle can be uploaded to a separate computing device. For example, the executable asset bundle can be uploaded to a server computer via a computer network. In some such embodiments, the plug-in module can be used to upload the executable asset bundle to the server computer.

At 240, an executable program is compiled using the IDE without the one or more source code assets and the one or more 3D model assets included in the executable asset bundle. For example, the executable program 160 can be compiled using the IDE 115. In at least some embodiments, the development assets included in the executable asset bundle are excluded by unloading them from the IDE after the executable asset bundle is exported. Alternatively, the one or more source code assets and/or the one or more 3D model assets can be identified in the IDE (for example as part of a project configuration) as excluded from any compilation operation. Compiling the executable program can comprise generating executable instructions based on one or more source code assets loaded in the IDE that are not included in the executable asset bundle. Additionally or alternatively, the compiling can comprise generating an interactive 3D application (such as a virtual reality application, an augmented reality application, or the like) in which the executable asset bundle can be dynamically loaded at runtime on a client computing device.

Example 3—Example Systems and Methods for Using Executable Asset Bundles

In any of the examples described herein, systems and methods can be provided for using executable asset bundles.

Figure 3:
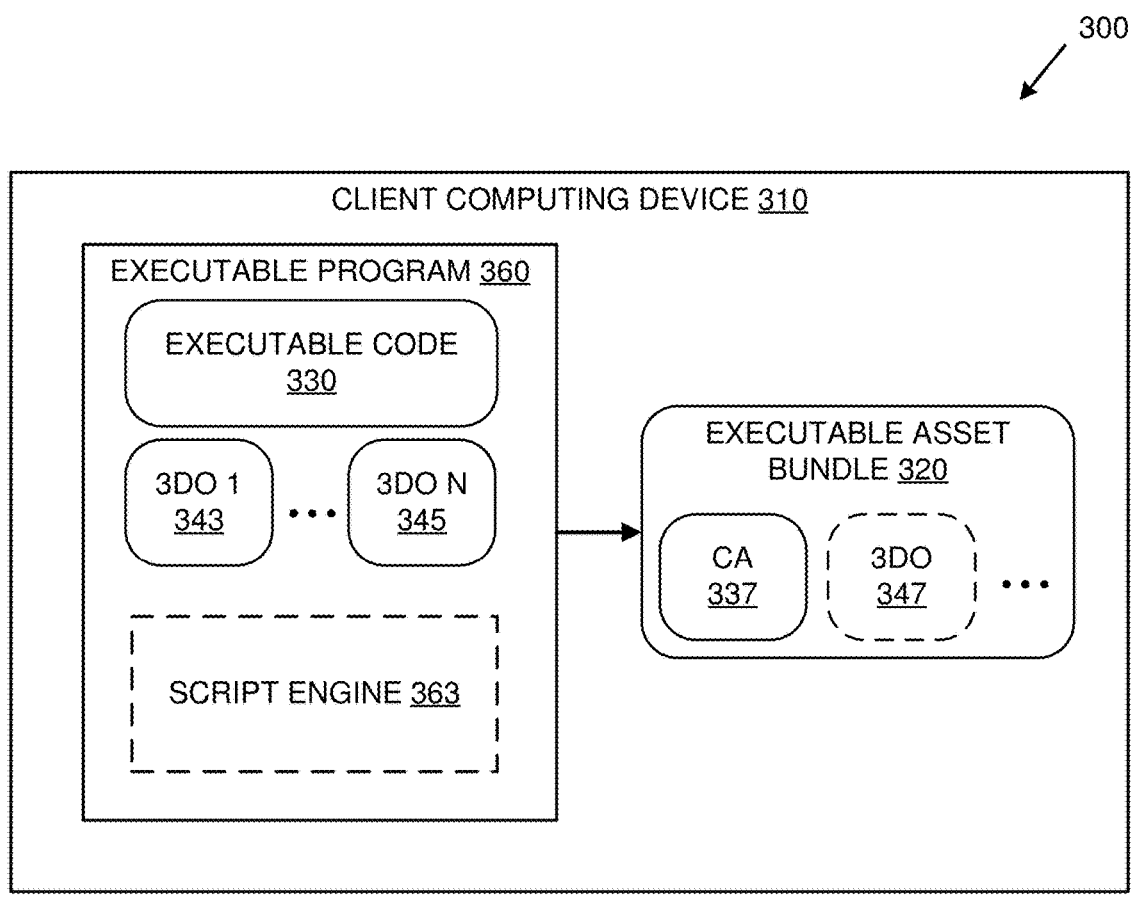
FIG. 3 is a system diagram depicting an example system comprising a client computing device.

FIG. 3 is a system diagram depicting an example system 300 for using an executable asset bundle (e.g., 320). The example system 300 comprises a client computing device 310 comprising an executable program 360. The executable program 360 can be an executable program generated by another computing device (such as the executable program 160 depicted in FIG. 1 that is generated by the development computing device 110). The executable program 360 comprises a plurality of executable instructions (executable code) 330. In at least some embodiments, the executable program 360 further comprises a plurality of 3D objects 343-345. Example 3D objects include 3D model assets (e.g., 141-145) compiled into the executable program via an IDE (e.g., 115). The executable code 330 can comprise instructions to interact with the plurality of 3D objects. Example interactions can include instructions to display representations of the 3D objects 343-345 on a graphical display (not shown) of the client computing device 310, instructions to transform one or more of the 3D objects 343-345, instructions to receive input from one or more user input devices (not shown) connected to the client computing device 310, etc. The client computing device 310 can be configured execute the executable code 330 using one or more processors (not shown) of the client computing device 310.

The client computing device 310 further comprises an executable asset bundle 320. The executable asset bundle 320 can be an executable asset bundle generated by another computing device (such as the executable asset bundle 150 depicted in FIG. 1 that is generated by the computing device 110). The executable asset bundle comprises one or more executable code assets (e.g., 337). Optionally, the executable asset bundle can comprise one or more 3D objects (e.g., 347). Example code assets include executable instructions generated by an IDE (e.g., 115) based on one or more source code assets (e.g., 141-145). Example 3D objects include 3D model assets (e.g., 141-145) compiled into an executable asset bundle (e.g., 150) via an IDE (e.g., 115). The executable code asset 337 can comprise executable instructions to interact with the 3D object 347. Example interactions can include instructions to display a representation of the 3D object 347 on a graphical display (not shown) of the client computing device 310, instructions to transform the 3D object 347, instructions to receive input from one or more user input devices (not shown) connected to the client computing device 310, etc. It is possible for the executable asset bundle to include other code assets for interacting with other 3D objects, some or all of which can also be included in the executable asset bundle 320.

The executable asset bundle 320 can be loaded on the client computing device 310 using the executable program 360. For example, the executable code 330 can comprise instructions that, when executed by the client computing device 301, cause the executable asset bundle to be loaded. In at least some embodiments, loading the executable asset bundle 320 on the client computing device 310 comprises detecting a selection of a user interface element of the executable program 360 (such as a button, link, menu item, etc.) and, responsive to the detecting, loading one or more code assets (e.g., 337) from the executable asset bundle 320 and/or loading one or more 3D objects (e.g., 347) from the executable asset bundle 320. In a different or further embodiment, loading the executable asset bundle 320 can comprise downloading the executable asset bundle 320 from another computing device (not shown) via a computer network connection (not shown) of the client computing device 310.

Optionally, the executable program 360 can comprise a script engine 363. The script engine 363 can be used to generate executable instructions based on one or more scripting language assets. For example, the executable code 330 can comprise instructions written in a scripting language. These instructions can be processed using the scripting engine 363 to generate corresponding instructions in a machine code that can be processed by one or more processors of the client computing device 310. In a different or further embodiment, one or more of the code assets (e.g., 337) in the executable asset bundle 320 can be script assets that comprise instructions written in a scripting language. In such an embodiment, loading and/or running the executable asset bundle 320 on the client computing device 310 can comprise interpreting one or more of the script assets using the script engine 363.

Although the script engine 363 is depicted as being part of the executable program 360, in at least some embodiments, the script engine can be separate from the executable program 360. For example, the script engine 360 can be part of a separate runtime (not shown) that is used to execute the executable program 360 on the client computing device 310. In a different or further embodiment, the script engine 363 can be a part of the executable asset bundle 320.

Figure 4:
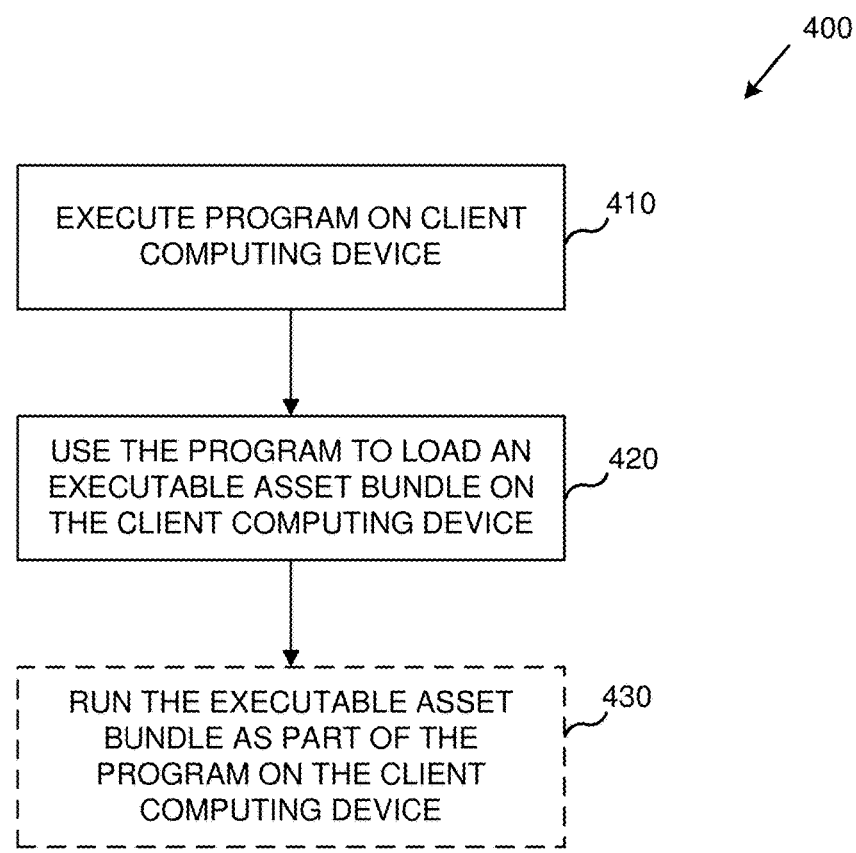
FIG. 4 is a flowchart of an example method for using an executable asset bundle.

FIG. 4 is a flowchart of an example method 400 for using an executable asset bundle. Any of the example system described herein can be used to perform the example method 400. For example, the example system 300 can be used to perform all or part of the example method 400.

At 410, an executable program is executed on a client computing device. For example, the executable program 360 can be executed on the client computing device 310. In at least some embodiments, executing the executable program can comprise executing machine-readable instructions stored in the executable program. The executable program can comprise one or more 3D model assets (e.g., data structures representing one or more 3D objects). The executable instructions can comprise instructions for interacting with the one or more 3D model assets via one or more user interfaces. For example, the executable program can be a 3D interactive application comprising one or more user interfaces through which a user can interact with the one or more 3D objects. In a different or further embodiment, executing the executable program can comprise loading the executable instructions and/or one or more 3D model assets into a memory space of the executable program, such as a space in a memory of the client computing device allocated to the executable program by an operating system of the client computing device.

At 420, the executable program is used to load an executable asset bundle on the client computing device. For example, the executable program 360 can be used to load the executable asset bundle 320 on the client computing device 310. Loading the executable asset bundle can be triggered by an interaction with a user interface of the executable program. For example, the executable program can comprise a user interface with one or more user interface elements (buttons, links, menus, etc.) that can be used to trigger the loading of the executable asset bundle. Additionally or alternatively, loading the executable asset bundle can comprise downloading the executable asset bundle from a server via a computer network.

The executable asset bundle can comprise one or more code assets (such as one or more source code assets, one or more compiled code assets, etc.) and/or one or more 3D model assets. The code assets can comprise instructions for interacting with the one or more 3D models assets in the executable asset bundle. In at least some embodiments, loading the executable asset bundle can comprise loading one or more of the 3D model assets into a memory space of the executable program. Additionally or alternatively, loading the executable asset bundle can comprise loading one or more code assets from the executable asset bundle into the memory space of the executable program. In at least some embodiments, the executable asset bundle comprises one or more source code assets. In such embodiments, loading the executable asset bundle can comprise generating executable instructions based on the source code assets. For example, the source code assets can comprise source code written in a scripting language that can be used by the executable program to generate executable instructions using a scripting engine.

Optionally, at 430, the executable asset bundle is run as part of the executable program on the client computing device. For example, one or more code assets of the executable asset bundle can be executed by the client computing device as part of the executable program after they are loaded by the executable program. Additionally or alternatively, running the executable program can comprise displaying one or more 3D model assets loaded from the executable asset bundle in a user interface of the executable program. The user interface can allow a user to interact with the loaded one or more 3D model assets as if they were 3D model assets included in the executable program. In a particular embodiment, a code asset loaded from the executable asset bundle comprises instructions that the executable program causes the client computing device to execute in response to detecting interactions with one or more 3D objects loaded from the executable asset bundle in a user interface of the executable program.

Example 4—Example Systems for Deploying Executable Asset Bundles

In any of the examples described herein, systems and methods can be provided for deploying executable asset bundles.

Figure 5:
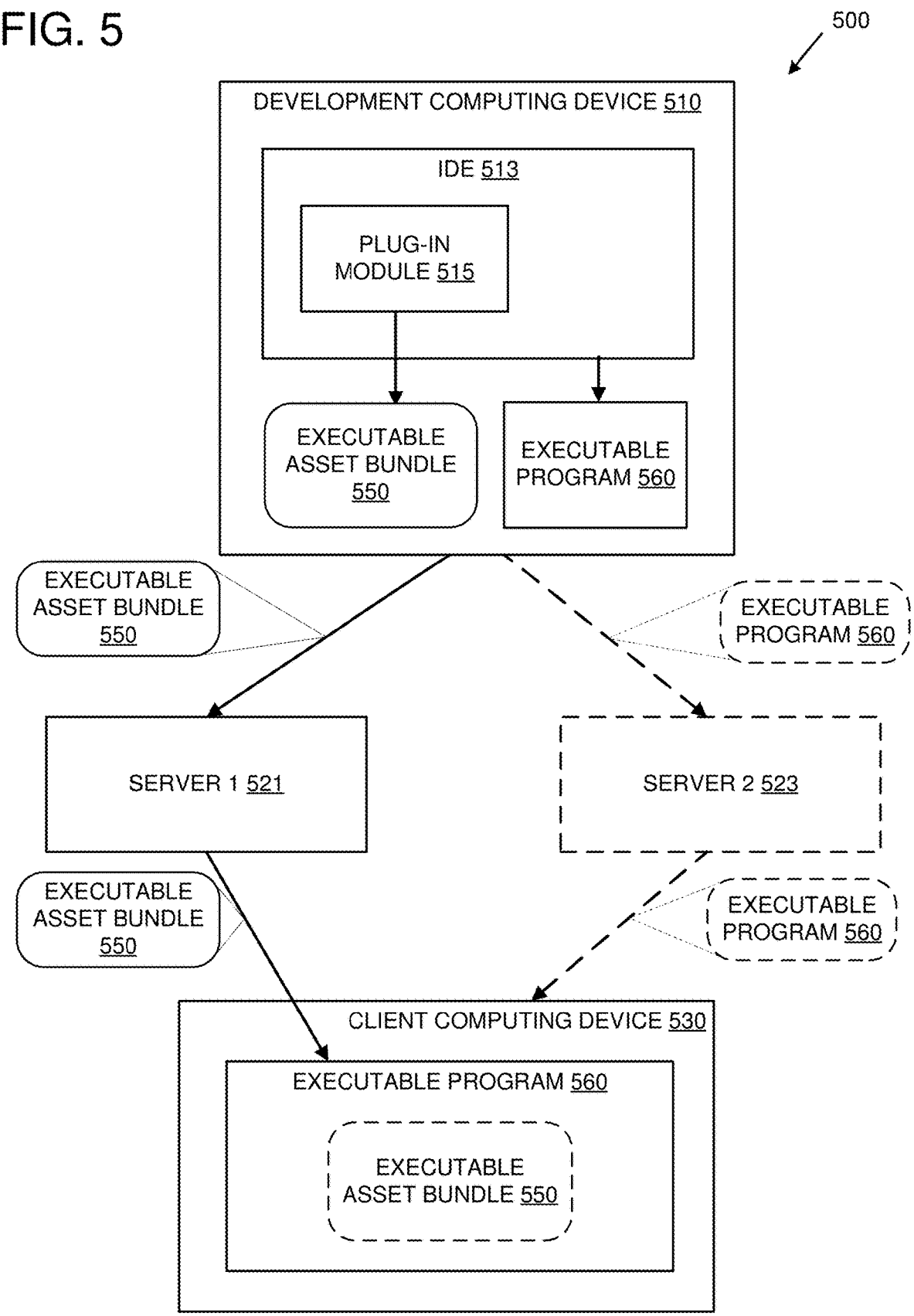
FIG. 5 is a system diagram depicting an example system comprising a development computing device, a client computing device, and a server.

FIG. 5 is a system diagram depicting an example system 500 comprising a development computing device 510, a client computing device 530, and a server 521. The development computing device 510 comprises an integrated development environment (IDE) 513. The IDE 513 comprises a plug-in module 515 that, when loaded into the IDE 513, extends and/or modifies the functionality of the IDE 513. The plug-in module 515 provides functionality to generate an executable asset bundle 550 that is based on one or more source code assets and/or one or more 3D model assets (not shown) that are loaded in the IDE 513. For example, the plug-in module 515 can be configured to display one or more user interfaces in the IDE 513. One or more of these user interfaces can be used to generate the executable asset bundle 550. For example, one or more source code assets and/or one or more 3D model assets can be selected via a user interface of the plug-in module 515.

The IDE 513 is configured to generate an executable program 560 that is based on source code assets that are not included in the executable asset bundle 550. In at least some embodiments, the executable program 560 can include one or more 3D model assets that are not included in the executable asset bundle 550. In a different or further embodiment, source code assets can be associated with 3D model assets that the source code assets access and/or manipulate. One or more 3D model assets, and their associated source code assets, can be used to generate the executable asset bundle 550 in order to deploy and/or distribute these 3D model assets and their associated functionality separately from the executable program 560.

In at least some embodiments, the plug-in module 515 can be used to inject functionality into the executable program 560 that, when executed, enables the executable program 560 to dynamically load the executable asset bundle 550 and to access its 3D model assets and associated functionality.

Although only source code assets and 3D model assets are mentioned, it is possible for the executable asset bundle 550 and/or the executable program 560 to incorporate other types of application assets (such as a graphical image assets, audio assets, configuration files, etc.).

The development computing device 510 is configured to deploy the executable asset bundle 550 to a server computer 521. The executable asset bundle 550 can be deployed via a computer network to which the development computing device 510 and the server computer 521 are connected. In at least some embodiments, the development computing device 510 does not deploy the executable asset bundle 550 directly to the server computer 521. For example, the development computing device 510 can be configured to upload the executable asset bundle 550 to one or more other servers (not shown) for the purposes of quality assurance testing and/or staging operations before it is ultimately deployed to the server computer 521. In at least some embodiments, the IDE 513 can be used to deploy the executable asset bundle 550. In at least some such embodiments, the functionality to deploy the executable asset bundle 550 can be provided by the plug-in module 515.

The example system 500 comprises a client computing device 530 that is configured to execute the executable program 560. The executable program 560 can be deployed to the client computing device 530. For example, the executable program 560 can be deployed to another server computer 523, from which the executable program 560 can be downloaded by the client computing device 530. In at least some embodiments, the development computing device 510 (or another computing device) is configured to deploy the executable asset bundle 550 to the server computer 521 and to separately deploy the executable program 560 to the server computer 523.

The executable program 560 can be configured to download the executable asset bundle 550 from the server computer 521. For example, the executable program 560 can be configured to detect an interaction with a user interface of the executable program 560 and, in response, attempt to dynamically load the executable asset bundle 550. If the executable asset bundle 550 is not already present on the client computing device 530, the executable program 560 can attempt to download the executable asset bundle 550 from the server computer 521. Additionally or alternatively, the executable program 560 can be configured to download the executable asset bundle 550 from the server computer 521 at another time (such as when the executable program 560 is installed on the client computing device 530, when the executable program 560 is launched, etc.).

In at least some embodiments, logic to download the executable asset bundle 550 and to load the executable asset bundle 550 on the client computing device 530 can be injected into the executable program 560 by the plug-in module 515. For example, the plug-in module 515 can be configured to modify a compile operation of the IDE 513 to add logic related to downloading and/or loading the executable asset bundle 550 to the executable program 560 as it is compiled by the IDE 513. Alternatively, the plug-in module 515 can be configured to add source code assets to a project in the IDE 513 from which the executable program 560 is generated. The source code assets can be used by the IDE 513 to generate logic for downloading the executable asset bundle 550 from the server computer 521 and/or loading the executable asset bundle 550 on the client computing device 530.

In at least some embodiments, one or more code dependencies of source code assets included in the executable asset bundle 550 can be excluded from the executable asset bundle 550. For example, the plug-in module 515 can be configured to detect code dependencies of source code assets selected for inclusion in the executable asset bundle 550. Example code dependencies include executable libraries, source code libraries, and/or other source code assets that are referenced by source code assets that are included in the executable asset bundle 550.

A plug-in user interface provided by the plug-in module 515 can be used to display the detected code dependencies and to allow a user of the IDE 513 to exclude one or more of the detected code dependencies. Additionally or alternatively, one or more code dependencies can be excluded based on a configuration of the client computing device 530. For example, a given code dependency may already be present on the client computing device 530, or a given code dependency may not be necessary for the executable asset bundle 550 to operate on the client computing device 530. In a particular example, a given source code asset may utilize an executable library for interacting with an underlying computing platform of the client computing device 530. It may be determined that this executable library is already present on the client computing device 530 and, thus, can be excluded from the executable asset bundle 550. In at least some embodiments, code dependencies are excluded by the plug-in module 515 when the executable asset bundle 550 is generated. Additionally or alternatively, the server computer 521 can be configured to exclude code dependencies from the executable asset bundle 550 when it is downloaded to the client computing device 530. For example, the server computer 521 can analyze a configuration of the client computing device 530 (by accessing the computing device 530, by analyzing a configuration manifest provided to the server computer 521 by the client computing device 530, etc.) And to determine that one or more code dependencies of the executable asset bundle 550 do not need to be included when the executable asset bundle 550 is deployed to the client computing device 530.

Example 5—Example Integrated Development Environment User Interface

In any of the examples described herein, a plug-in module comprising a user interface can be provided for generating smart asset bundles.

Figure 6:
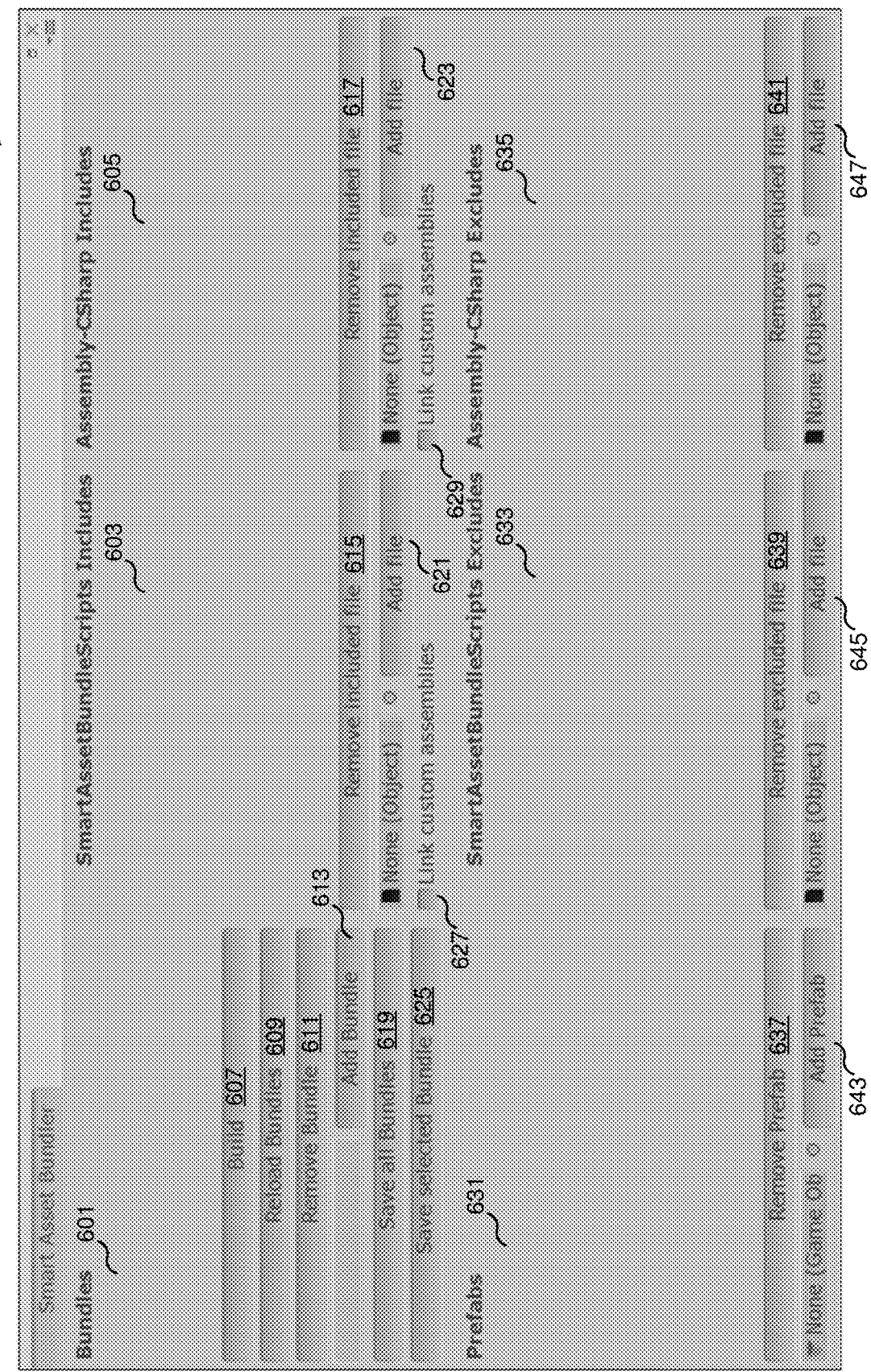
FIG. 6 is a diagram depicting an example integrated development environment plug-in user interface.

FIG. 6 is a diagram depicting an example integrated development environment (IDE) plug-in user interface 600. The user interface 600 can be provided by a plug-in module (not shown) loaded into an IDE (not shown). In a particular embodiment, the user interface 600 is provided by a plug-in module loaded in an IDE comprising a UNITY® real-time development platform. The plug-in user interface 600 can be displayed as part of a user interface of the IDE.

The plug-in user interface 600 comprises a user interface component 601 that can be used to display a configuration of an executable asset bundle that can be used to generate an executable asset bundle using the plug-in user interface 600. A button 613 can be used to create a new executable asset bundle. Once a new executable asset bundle has been created, application development assets (such as 3D model assets, UNITY® real-time development platform prefabs, etc.) can be added to the executable asset bundle using the button 643. application development assets (such as 3D model assets, UNITY® real-time development platform prefabs, or the like) that are included in a the executable asset bundle can be displayed in a user interface component 631. A button 637 can be used to remove an application development asset from the executable asset bundle. Source code assets (such as script files, etc.) can be added to the executable asset bundle using a button 621. Source code assets that have been included in the executable asset bundle can be displayed in the user interface component 603. A button 615 can be used to remove a selected source code asset from the executable asset bundle. In at least some embodiments, where .NET assemblies are supported, a user interface component 627 can be used to indicate whether or not custom .NET assemblies that are referenced by included source code assets should be dynamically linked to the executable asset bundle.

Source code assets can be dynamically linked to the executable asset bundle using a button 623. Source code assets that are linked to the executable asset bundle can be displayed in the user interface component 605. A button 617 can be used to remove a linked source code asset from the executable asset bundle. In an embodiment where one or more source code assets are linked to the executable asset bundle, a user interface component 629 can be used to indicate whether or not custom .NET assemblies are referenced by any linked source code assets In at least some embodiments, the plug-in module providing the plug-in module user interface 600 can be configured to detect code dependencies of source code assets and/or pre-generated libraries that are included in the executable asset bundle. Additionally or alternatively, code dependencies can be detected when an executable asset bundle is generated. Example code dependencies include other source code assets and/or other pre-generated libraries. Detected code dependencies can be automatically included in the executable asset bundle. For example, detected source code asset dependencies can be automatically added to the executable asset bundle and displayed in the user interface component 603. For example, detected source code asset dependencies can be automatically linked to the executable asset bundle and displayed in the user interface component 605.

The plug-in user interface 600 can be used to exclude code dependencies indicated by the user from the executable asset bundle. The button 645 can be used to add a user indicated source code asset dependency to an exclusion list which can be displayed in a user interface component 633. A button 639 can be used to remove a selected source code asset dependency from the exclusion list. In an embodiment where one or more source code assets are linked to the executable asset bundle, the button 647 can be used to add a user indicated source code asset dependency for linked source code assets to an exclusion list which can be displayed in a user interface component 635. A button 641 can be used to remove a selected source code asset dependency from the exclusion list.

A button 607 can be used to generate the executable asset bundle. In at least some embodiments, generating the executable asset bundle can comprise generating an executable library (such as a .NET assembly) based on the 3D model assets, source code assets, and/or pre-generated library assets that are identified in the plug-in user interface 600 as being included in (or linked to) the executable asset bundle. A button 609 can be used to reload a list of executable asset bundle configurations displayed in the user interface component 601. A button 611 can be used to remove a selected executable asset bundle configuration.

Example 6—Example Integrated Development Environments

In any of the examples described herein, an integrated development environment (IDE) can comprise one or more software applications for editing source code assets and generating an executable program based on source code assets loaded in the IDE. At least some IDE's comprise user interfaces for editing other types of computer program assets as well (such as 3D model assets, graphical image assets, audio assets, etc.). At least some IDE's provide functionality for project management. For example, an IDE may provide a user interface for managing multiple computer program assets that are compiled into a single executable program. Such a user interface may allow a user to open a project file, which will cause multiple program assets identified in the project file to be loaded into the IDE where they can then be edited using one or more other user interfaces of the IDE. Example IDE's included UNITY® real-time development platform, MICROSOFT VISUAL STUDIO, ECLIPSE, and the like.

Example 7—Example Integrated Development Environment Plug-in Modules

In any of the examples described herein, a plug-in module can comprise one or more files containing executable instructions (such as one or more executable programs or one or more executable libraries) that can be used to extend and/or modify functionality provided by an IDE. For example, some IDE's (such as UNITY® real-time development platform and MICROSOFT VISUAL STUDIO) provide frameworks for loading plug-in modules and expose an application programming interfaces (API's) that can be used by a plug-in module to interface with an IDE. Such an IDE may be configured to examine a particular storage location (such as a particular file directory) for plug-in module files to load when the IDE program begins execution. However, in at least some embodiments, a plug-in module can comprise instructions for directly modifying one or more executable files of an IDE to extend and/or alter functionality of those executable files. Additionally or alternatively, a plug-in module may be designed to replace one or more executable files of an IDE with versions of those executable files that provide additional and/or altered functionality.

In at least some embodiments, a plug-in module can comprise executable instructions to display one or more plug-in user interfaces within a user interface of a hosting IDE. Such plug-in user interfaces can comprise custom windows and other user interface components that can be displayed to a user of the IDE. In some scenarios, a plug-in user interface can be displayed in response to an interaction with a user interface of the IDE by a user. Additionally or alternatively, plug-in user interfaces can be displayed automatically and/or in response to detected events (such as initiation of a compile operation).

Example 8—Example Executable Asset Bundles

In any of the examples described herein, an executable asset bundle can comprise one or more 3D model assets selected using a plug-in module within an IDE and/or code based on one or more source code assets selected using a plug-in module within an IDE. In at least some embodiments, additional types of computer program assets (such as executable libraries, graphical image assets, audio assets, configuration files, etc.) can also be included in the executable asset bundle. The code in the executable asset bundle can comprise instructions for displaying 3D model assets (such as 3D model assets included in the executable asset bundle), interacting with the 3D model assets, and/or modifying the 3D model assets. In at least some embodiments, the executable asset bundle is generated by compiling the included source code assets into a set of executable instructions and bundling the executable instructions in a distributable file. In at least some embodiments, one or more 3D model assets can also be bundled in the distributable file with the executable instructions. Additionally or alternatively, the executable asset bundle can include the source code assets and 3D model assets in a distributable file. In such an embodiment, the source code assets can be used to generate executable instructions when the executable asset bundle is loaded on a client computing device (such as by compiling the source code assets into executable instructions, generating executable instructions using the source code assets and a script engine, etc.). In a particular embodiment, the executable asset bundle can comprise one or more .NET assemblies that include byte code based on the source code assets.

Example 9—Example Computing Systems

Figure 7:
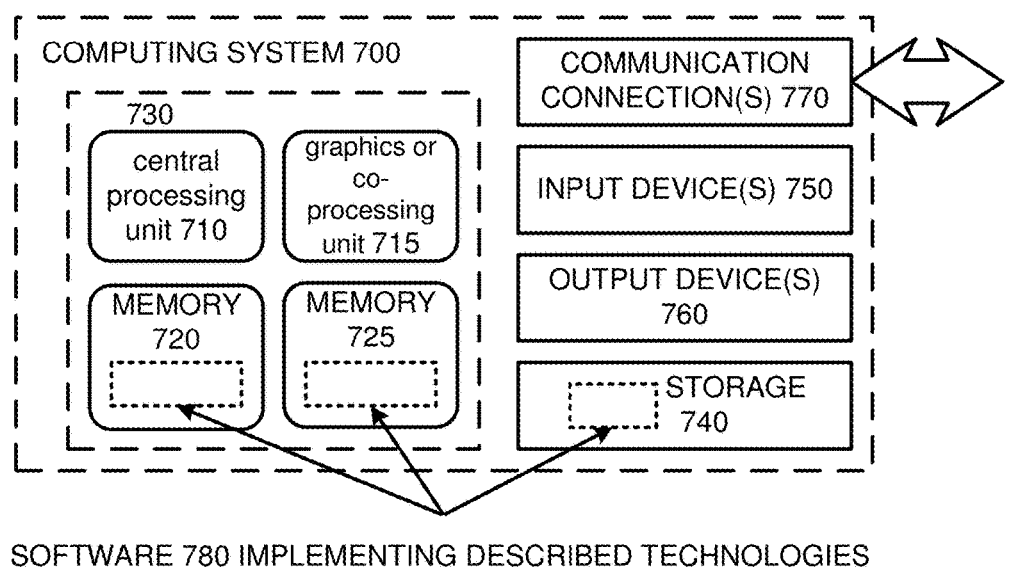
FIG. 7 is a block diagram of an example computing system in which some described embodiments can be implemented.

FIG. 7 depicts a generalized example of a suitable computing system 700 in which the described innovations may be implemented. For example, the computing system 700 can be used as a development computing device, client computing device, and/or server computer as described herein. The computing system 700 is not intended to suggest any limitation as to scope of use or functionality, as the innovations may be implemented in diverse general-purpose or special-purpose computing systems.

With reference to FIG. 7, the computing system 700 includes one or more processing units 710, 715 and memory 720, 725. In FIG. 7, this basic configuration 730 is included within a dashed line. The processing units 710, 715 execute computer-executable instructions. A processing unit can be a general-purpose central processing unit (CPU), processor in an application-specific integrated circuit (ASIC) or any other type of processor. In a multi-processing system, multiple processing units execute computer-executable instructions to increase processing power. For example, FIG. 7 shows a central processing unit 710 as well as a graphics processing unit or co-processing unit 715. The tangible memory 720, 725 may be volatile memory (e.g., registers, cache, RAM), non-volatile memory (e.g., ROM, EEPROM, flash memory, solid state drives, etc.), or some combination of the two, accessible by the processing unit(s). The memory 720, 725 can store software 780 implementing one or more innovations described herein, in the form of computer-executable instructions suitable for execution by the processing unit(s).

A computing system may have additional features. For example, the computing system 700 includes storage 740, one or more input devices 750, one or more output devices 760, and one or more communication connections 770. An interconnection mechanism (not shown) such as a bus, controller, or network interconnects the components of the computing system 700. Typically, operating system software (not shown) provides an operating environment for other software executing in the computing system 700, and coordinates activities of the components of the computing system 700.

The tangible storage 740 may be removable or non-removable, and includes magnetic disks, magnetic tapes or cassettes, solid state drives, CD-ROMs, DVDs, or any other medium which can be used to store information in a non-transitory way and which can be accessed within the computing system 700. The storage 740 can store instructions for the software 780 implementing one or more innovations described herein.

The input device(s) 750 may be a touch input device such as a keyboard, mouse, pen, or trackball, a voice input device, a scanning device, or another device that provides input to the computing system 700. For video encoding, the input device(s) 750 may be a camera, video card, TV tuner card, or similar device that accepts video input in analog or digital form, or a CD-ROM or CD-RW that reads video samples into the computing system 700. The output device(s) 760 may be a display, printer, speaker, CD-writer, or another device that provides output from the computing system 700.

The communication connection(s) 770 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

The innovations can be described in the general context of computer-executable instructions, such as those included in program modules, being executed in a computing system on a target real or virtual processor. Generally, program modules include routines, programs, libraries, objects, classes, components, data structures, etc. that perform particular tasks or implement particular abstract data types. The functionality of the program modules may be combined or split between program modules as desired in various embodiments. Computer-executable instructions for program modules may be executed within a local or distributed computing system.

For the sake of presentation, the detailed description uses terms like "determine" and "use" to describe computer operations in a computing system. These terms are high-level abstractions for operations performed by a computer, and should not be confused with acts performed by a human being. The actual computer operations corresponding to these terms vary depending on implementation.

Example 10—Example Cloud Computing Environment

Figure 8:
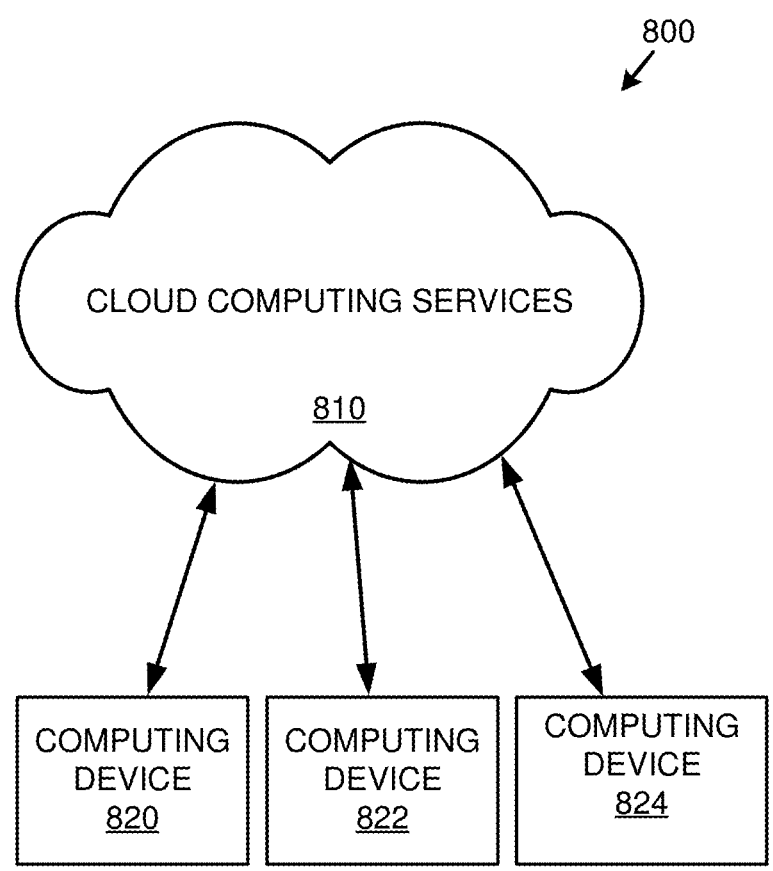
FIG. 8 is an example cloud computing environment that can be used in conjunction with the technologies described herein.

FIG. 8 depicts an example cloud computing environment 800 in which the described technologies can be implemented. The cloud computing environment 800 comprises cloud computing services 810. The cloud computing services 810 can comprise various types of cloud computing resources, such as computer servers, data storage repositories, networking resources, etc. For example, one or more computer servers of the cloud computing services 810 can be used as a server as described herein. The cloud computing services 810 can be centrally located (e.g., provided by a data center of a business or organization) or distributed (e.g., provided by various computing resources located at different locations, such as different data centers and/or located in different cities or countries).

The cloud computing services 810 are utilized by various types of computing devices (e.g., client computing devices), such as computing devices 820, 822, and 824. For example, the computing devices (e.g., 820, 822, and 824) can be computers (e.g., desktop or laptop computers), mobile devices (e.g., tablet computers or smart phones), or other types of computing devices. For example, the computing devices (e.g., 820, 822, and 824) can utilize the cloud computing services 810 to perform computing operators (e.g., data processing, data storage, and the like). One or more of the computing devices can be embedded devices that comprise integrated circuits (such as Internet of Things (IoT) devices, etc.).

Example 11—Example Implementations

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods.

Any of the disclosed methods can be implemented as computer-executable instructions or a computer program product stored on one or more computer-readable storage media and executed on a computing device (e.g., any available computing device, including smart phones or other mobile devices that include computing hardware). Computer-readable storage media can include any tangible media that can be accessed within a computing environment (e.g., one or more optical media discs such as DVD or CD, volatile memory components (such as DRAM or SRAM), or non-volatile memory components (such as flash memory, solid state drives, or magnetic media such as hard drives)). By way of example and with reference to FIG. 7, computer-readable storage media include memory 720 and 725, and storage 740. The term computer-readable storage media does not include signals and carrier waves. In addition, the term computer-readable storage media does not include communication connections (e.g., 770).

Any of the computer-executable instructions for implementing the disclosed techniques as well as any data created and used during implementation of the disclosed embodiments can be stored on one or more computer-readable storage media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

The disclosed technology is not limited to any specific computer language or program. For instance, the disclosed technology can be implemented by software written in C++, Java, Perl, JavaScript, assembly language, or any other suitable programming language. Likewise, the disclosed technology is not limited to any particular computer or type of hardware.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

The disclosed methods, apparatus, and systems should not be construed as limiting in any way. Instead, the present disclosure is directed toward all novel and nonobvious features and aspects of the various disclosed embodiments, alone and in various combinations and sub combinations with one another. The disclosed methods, apparatus, and systems are not limited to any specific aspect or feature or combination thereof, nor do the disclosed embodiments require that any one or more specific advantages be present or problems be solved.

The technologies from any example can be combined with the technologies described in any one or more of the other examples. In view of the many possible embodiments to which the principles of the disclosed technologies may be applied, it should be recognized that the illustrated embodiments are examples of the disclosed technologies and should not be taken as a limitation on the scope of the disclosed technologies. Rather, the scope of the disclosed technologies includes what is covered by the scope and spirit of the following claims.

What is claimed is:

1. A method, comprising:
creating an executable asset bundle that is dynamically loaded by an executable program at runtime, wherein the creating comprises:
loading a plug-in module into an integrated development environment, wherein the plug-in module modifies functionality provided by the integrated development environment;
using the plug-in module and the integrated development environment to generate the executable asset bundle based on one or more source code assets and one or more three-dimensional model assets loaded in the integrated development environment, wherein the one or more source code assets comprise executable instructions to interact with the one or more three-dimensional model assets, wherein the plug-in module generates the executable asset bundle, and the plug-in module comprises one or more user interfaces that select at least one of the one or more source code assets or the one or more three-dimensional model assets for exclusion from the executable asset bundle; and
exporting the executable asset bundle from the integrated development environment;
wherein the executable asset bundle is separate from the executable program that is compiled without the one or more source code assets and the one or more three-dimensional model assets not selected for exclusion from the executable asset bundle.

2. The method of claim 1, further comprising:
executing the executable program on a client computing device;
loading, using the executable program, the executable asset bundle on the client computing device; and
running the executable asset bundle as part of the executable program on the client computing device.

3. The method of claim 2, further comprising:
excluding a code dependency of one of the one or more source code assets from the executable asset bundle based on a configuration of the client computing device.

4. The method of claim 2, wherein the loading the executable asset bundle comprises downloading the executable asset bundle from a server computer via a computer network.

5. The method of claim 2, wherein:
the one or more source code assets comprises a script asset; and
the running the executable asset bundle comprises interpreting the script asset using a script engine that is part of the executable program.

6. The method of claim 1, further comprising:
uploading the executable asset bundle to a server computer via a computer network.

7. The method of claim 1, wherein:
loading the plug-in module into the integrated development environment comprises loading a user interface component of the plug-in module into a user interface of the integrated development environment; and
the method further comprises excluding a code dependency of one of the one or more source code assets from the executable asset bundle via the user interface component.

8. The method of claim 1, wherein the executable instructions to interact with the one or more three-dimensional model assets comprise instructions to display the one or more three-dimensional model assets on a graphical display.

9. One or more non-transitory computer-readable storage media storing instructions that, when executed by one or more processors, cause the one or more processors to perform operations, the operations comprising:
creating an executable asset bundle that is dynamically loaded by an executable program at runtime, wherein the creating comprises:
displaying a user interface in an integrated development environment;
generating an executable asset bundle based on one or more source code assets and one or more three-dimensional model assets in a project in the integrated development environment, wherein the one or more source code assets comprise executable instructions to interact with the one or more three-dimensional model assets, and wherein the user interface selects at least one of the one or more source code assets or the one or more three-dimensional model assets for exclusion from the executable asset bundle;
generating the executable asset bundle, wherein the executable asset bundle comprises an executable library based on the one or more source code assets and the one or more three-dimensional model assets not selected for exclusion and excludes the at least one of the one or more source code assets or the one or more three-dimensional model assets selected for exclusion from the executable asset bundle; and
exporting the executable asset bundle from the integrated development environment;
wherein the executable asset bundle is separate from the executable program that is compiled without the one or more source code assets and the one or more three-dimensional model assets of the executable library in the executable asset bundle.

10. The one or more non-transitory computer-readable storage media of claim 9, wherein the operations further comprise:
executing the executable program on a client computing device; and
loading, using the executable program, the executable asset bundle on the client computing device.

11. The one or more non-transitory computer-readable storage media of claim 10, wherein the loading the executable asset bundle on the client computing device comprises:
loading the one or more three-dimensional model assets into a memory space of the executable program; and
executing the executable instructions to interact with the one or more three-dimensional model assets.

12. The one or more non-transitory computer-readable storage media of claim 10, wherein the loading the executable asset bundle on the client computing device comprises downloading the executable asset bundle to the client computing device from a server via a computer network.

13. The one or more non-transitory computer-readable storage media of claim 10, wherein the loading the executable asset bundle on the client computing device comprises:
detecting a selection of a user interface element of the executable program; and
responsive to the detecting, loading the one or more three-dimensional model assets and the executable instructions from the executable asset bundle.

14. The one or more non-transitory computer-readable storage media of claim 9, wherein the operations further comprise:
uploading the executable asset bundle to a remote server computer via a computer network.

15. The one or more non-transitory computer-readable storage media of claim 9, wherein the operations further comprise:
excluding a code dependency of one of the one or more source code assets from the executable asset bundle based on a selection detected via the user interface.

16. The one or more non-transitory computer-readable storage media of claim 9, wherein the operations further comprise:
excluding a code dependency of one of the one or more source code assets from the executable asset bundle based on a configuration of a client computing device.

17. The one or more non-transitory computer-readable storage media of claim 9, wherein the integrated development environment comprises a UNITY® real-time development platform.

18. A system, comprising:
a computing device comprising an integrated development environment and configured to:
load a plug-in module into the integrated development environment, wherein the plug-in module modifies functionality provided by the integrated development environment;
receive a selection of one or more source code assets and one or more three-dimensional model assets loaded in the integrated development environment via a user interface of the plug-in module, wherein the one or more source code assets comprise executable instructions to interact with the one or more three-dimensional model assets;
detect, by the plug-in module, code dependencies of the selected source code assets;
receive, via a user interface of the plug-in module, a selection of one or more of the detected code dependencies to be excluded from an executable asset bundle;
generate the executable asset bundle based on the selected one or more source code assets and the one or more three-dimensional model assets using the plug-in module, wherein the plug-in module generates the executable asset bundle, and the plug-in module excludes from the executable asset bundle the one or more code dependencies selected to be excluded;

export the executable asset bundle from the integrated development environment; and generate an executable program based on a project, wherein the executable program excludes the selected one or more source code assets and the one or more three-dimensional model assets.

19. The system of claim 18, wherein the computing device is further configured to upload the executable asset bundle to a second computing device via a computer network.

\* \* \* \* \*